US008510815B2

(12) United States Patent
Sekiguchi et al.

(10) Patent No.: US 8,510,815 B2
(45) Date of Patent: Aug. 13, 2013

(54) VIRTUAL COMPUTER SYSTEM, ACCESS CONTROL METHOD AND COMMUNICATION DEVICE FOR THE SAME

(75) Inventors: Tomoki Sekiguchi, Sagamihara (JP); Hirofumi Inomata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 347 days.

(21) Appl. No.: 12/793,914

(22) Filed: Jun. 4, 2010

(65) Prior Publication Data

US 2010/0313256 A1 Dec. 9, 2010

(30) Foreign Application Priority Data

Jun. 5, 2009 (JP) ................................. 2009-135691

(51) Int. Cl.
*G06F 7/04* (2006.01)
*G06F 15/16* (2006.01)
*G06F 17/30* (2006.01)
*G06F 21/00* (2006.01)

(52) U.S. Cl.
USPC ...... 726/7; 726/5; 726/15; 713/168; 713/182; 713/184; 709/229; 709/223; 709/215; 709/221; 709/218; 370/357

(58) Field of Classification Search
USPC .................. 726/5, 7, 15; 713/168, 182, 184; 709/221, 215, 218, 223, 229; 370/357
See application file for complete search history.

(56) References Cited

U.S. PATENT DOCUMENTS

| | | | |
|---|---|---|---|
| 6,418,472 B1 * | 7/2002 | Mi et al. ........................ 709/229 |
| 7,260,636 B2 | 8/2007 | Blumenau et al. | |
| 7,778,157 B1 * | 8/2010 | Tawri et al. .................... 370/216 |
| 7,793,101 B2 * | 9/2010 | Wipfel et al. .................. 713/168 |
| 7,836,332 B2 | 11/2010 | Hara et al. | |
| 2002/0116616 A1 * | 8/2002 | Mi et al. ......................... 713/168 |
| 2003/0131115 A1 * | 7/2003 | Mi et al. ......................... 709/229 |
| 2006/0209863 A1 * | 9/2006 | Arndt et al. .................... 370/412 |
| 2007/0147267 A1 * | 6/2007 | Holland ......................... 370/252 |
| 2008/0022120 A1 * | 1/2008 | Factor et al. ................... 713/184 |
| 2008/0127326 A1 * | 5/2008 | Dugan et al. ..................... 726/15 |
| 2008/0201458 A1 * | 8/2008 | Salli ............................... 709/223 |
| 2009/0157846 A1 * | 6/2009 | Shimozono et al. .......... 709/218 |
| 2009/0254640 A1 * | 10/2009 | Otani ............................ 709/221 |

(Continued)

OTHER PUBLICATIONS

Robert Dugan et al. NPIV Functionality Profile. Aug. 5, 2002. p. 1-7.*
Brocade Fabric OS v6.1.0 Release Notes v1.0. Mar. 12, 2008. p. 1-114.*
Fabric OS Administrator's Guide. Dec. 15, 2011. p. 60-61.*

(Continued)

*Primary Examiner* — Edan Orgad
*Assistant Examiner* — Kari Schmidt
(74) *Attorney, Agent, or Firm* — Antonelli, Terry, Stout & Kraus, LLP.

(57) ABSTRACT

In a plural computer system executing a virtual computer, an exterior storage volume may receive unjustly multiple access, and contents of the volume may be destroyed. Provided are: a switch coupling a virtual computer and I/O, a virtual computer managing unit coupled to a computer and the switch, and a determination unit determining a login acceptance/rejection of a virtual computer and I/O. The virtual computer possesses a virtual HBA, and upon receiving a login inquiry to the I/O from a certain virtual computer, a determination unit compares an identifier allocated to the certain virtual computer with an identifier allocated to another virtual computer to be executed on a physical computer different from the physical computer on which the certain virtual computer is executed, and determines login acceptance/rejection. Accordingly, an access control to the I/O is performed.

20 Claims, 10 Drawing Sheets

(56) References Cited

U.S. PATENT DOCUMENTS

| | | | |
|---|---|---|---|
| 2009/0307378 A1* | 12/2009 | Allen et al. | 710/4 |
| 2009/0307388 A1* | 12/2009 | Tchapda | 710/33 |
| 2010/0030923 A1* | 2/2010 | Frazier et al. | 710/11 |
| 2010/0100878 A1* | 4/2010 | Otani | 718/1 |
| 2011/0283026 A1* | 11/2011 | Otani | 710/72 |
| 2012/0060010 A1* | 3/2012 | Shimozono et al. | 711/165 |

OTHER PUBLICATIONS

NPIV Deployment Guide. Apr. 24, 2008. p. 1-38.*
NPIV Functionality Profile, N_Port ID Virtualization, Jun. 5, 2002, pp. 1-9.
FC-DA Fibre Channel Device Attach Revision 3.1 Aug. 3, 2004, pp. 43-49.

* cited by examiner

FABRIC TOPOLOGY TABLE

| PHYSICAL SERVER NAME AT CONNECTION DESTINATION | PHYSICAL HBA PORT | SWITCH NUMBER | PORT NUMBER |
|---|---|---|---|
| SERVER 1 | 1 | 1 | 1 |
| SERVER 2 | 1 | 1 | 2 |
| SERVER 3 | 1 | 2 | 1 |
|  |  |  |  |

301　302　303　304

142

WWN ALLOCATION TABLE

| VIRTUAL SERVER NAME | WWN | PHYSICAL SERVER NAME | PHYSICAL HBA PORT | RUNNING |
|---|---|---|---|---|
| VM-1 | WWN-1 | SERVER 1 | 1 | ○ |
| VM-2 | WWN-2 | SERVER 1 | 1 | ○ |
| VM-3 | WWN-3 | SERVER 2 | 1 |  |
|  |  |  |  |  |

LOGIN ACCEPTANCE SUMMARY TABLE

| PORT NUMBER | LOGIN ACCEPTED WWN |
|---|---|
| 1 | WWN-1 |
| 1 | WWN-2 |
| 2 | WWN-3 |

142
WWN ALLOCATION TABLE

| VIRTUAL SERVER NAME | WWN | PHYSICAL SERVER NAME | PHYSICAL HBA PORT | RUNNING |
|---|---|---|---|---|
| VM-1 | WWN-1 | SERVER 2 | 1 | O |
| VM-2 | WWN-2 | SERVER 1 | 1 | O |
| VM-3 | WWN-3 | SERVER 2 | 1 | |
| | | | | |

311　312　313　314　315

VIRTUAL COMPUTER SYSTEM, ACCESS CONTROL METHOD AND COMMUNICATION DEVICE FOR THE SAME

BACKGROUND OF THE INVENTION (1) Field of the Invention

The present invention relates to an access control method to an external device of a computer in a system including plural computers which execute a virtual computer.

(2) Description of the Related Art

Progress of virtualization technology has realized the functions which could not be accomplished with the constitution of the computing system in the past. One of the functions includes migration technology of a virtual computer. This is technology which migrates the virtual computer executed on a certain physical computer so as to make the virtual computer executable on the virtualization mechanism of other physical computers.

Generally, in order to realize the migration of a virtual computer, it is necessary to prepare a storage device and a network as external devices which are accessible from both related computers.

On the other hand, the function to restrict the access to a volume in the storage device and to the network is also utilized for the improvement in security. When such an access control function is utilized, it is common to set up an access restriction with the use of the name and address of a source which issues access to a resource.

A virtual computer may have the name and address related to access control to an external resource. Furthermore, it is common to migrate the name and address together with the migration of the virtual computer. Since the name and address are migrated together with the virtual computer, the access control functions satisfactorily, even if a setup of a switch or a storage device is not updated in time with the migration of the virtual computer.

As technology of assigning such a name and an address to a virtual computer, there is N-Port ID Virtualization (NPIV) of a Fibre Channel in storage, for example. (Refer to "NPIV Functional Profile", (online), issued on Aug. 1, 2002, INCITS (InterNational Committee for Information Technology Standard) Technical Committee T11, retrieved on Feb. 20, 2009 on the Internet (URL:http://www.tll.org/ftp/tll/pub/fc/da/02-338vl.pdf), and "FC-DA Technical Report", pp. 43-49, (online), issued on Aug. 3, 2004, INCITS (InterNational Committee for Information Technology Standard) Technical Committee T11, retrieved on Feb. 20, 2009 on the Internet (URL:http://www.tll.org/ftp/tll/pub/fc/da/04-202vA.pdf)). NPIV is technology for virtualizing the address on SAN (Storage Area Network) which is a network coupled to a storage device. A port of a Fibre Channel Adapter (a Host Bus Adapter, abbreviated as HBA) mounted in a computer is given an identifier called a WWN (World Wide Name). A Fibre Channel network (a storage network, fabric) configured with a Fibre Channel switch gives a network address called a port ID which is effective within the fabric, to a port of equipment coupled to the fabric, and performs routing of the data using the port ID. NPIV makes it possible to give plural WWNs and the corresponding port ID to a port of equipment. When NPIV is utilized, the virtualization mechanism can give a virtual WWN to a virtual HBA included in a virtual computer, accordingly, it is possible to utilize the access control of a Fibre Channel switch or a storage device.

SUMMARY OF THE INVENTION

According to the technology in the past, even to an external device which a virtual computer accesses, it is possible to set up access control through the use of a communication device coupled to both of the virtual computer and the external device, or through the use of an I/O device itself (for example, a storage device, a network, etc.) of the connection destination. However, in the environment in which a virtual computer migrates, there arises a case where the access control with the use of an identifier for accessing an I/O device, for example, the access control with the use of a WWN of a port, may not function.

In the process of recovery from system failure in a system which allows the migration of a virtual computer, for example, it may happen that the same virtual computer will be concurrently executed on plural physical computers by unjust setup to a virtualization mechanism, or that different virtual computers each given the same WWN accidentally will be concurrently executed on plural computers. Specifically, in the recovery procedure when a failure happens during migration, it may happen that virtual computers which possess the same WWN will be defined accidentally on both of a virtual computer and/or a physical computer of a migration source and a migration destination.

On the other hand, access control of storage based on the WWN cannot determine which is a right access request among the access requests to an I/O device which are issued from plural virtual computers with the same WWN as an issuing origin, therefore, access which is not meant may be permitted. Generally, the contents of a volume of storage will be destroyed when accessed from plural computers at the same time. Therefore, a file system and data which are stored in the volume may be destroyed, causing a fatal problem.

The present invention has been made in view of the above circumstances and provides a virtual computer system and an access control method in which the virtual computer system includes a virtual computer to be executed on a physical computer and a determination unit for determining acceptance/rejection of login to an external device from the virtual computer. Upon receiving login inquiry to the external device from a certain virtual computer and referring to allocation information of an identifier allocated to the virtual computer, the determination unit compares the identifier allocated to the certain virtual computer with the identifier allocated to another virtual computer to be executed on a physical computer different from the physical computer on which the certain virtual computer is executed, and determines the acceptance/rejection of the login. Accordingly, the access control to the external device is performed thereby.

A communication device according to the present invention includes a port possesses a port number, a port-ID allocation unit, and a cache which acquires periodically and holds summary information summarizing allocation information of an identifier allocated to a virtual computer on a physical computer, for use in accessing an external device. The summary information possesses the port number and a permitted identifier which is an identifier allocated to a virtual computer permitted to login via the port. The port-ID allocation unit determines acceptance/rejection of login, when login inquiry to the external device from a certain virtual computer is received.

According to the present invention, it is possible to determine which physical computer of a system sends a right access inquiry, among access inquiries to an external device which are issued using an identifier allocated to a virtual computer. Accordingly, it is possible to prevent unjust access to an external device.

BRIEF DESCRIPTION OF THE DRAWINGS

The present invention will become fully understood from the detailed description given hereinafter and the accompanying drawings, wherein.

DETAILED DESCRIPTION OF THE INVENTION

Hereinafter, with reference to the accompanying drawings, the embodiments of the present invention are explained in detail.

(Embodiment 1)

A first embodiment to which the present invention is applied is explained. The first embodiment will show a configuration of equipment and a method for preventing unjust access to storage in a system which includes a virtualization mechanism utilizing NPIV, in cooperation with a managing server which manages connection information of a Fibre Channel network and definition information of the virtualization mechanism.

Figure 1:
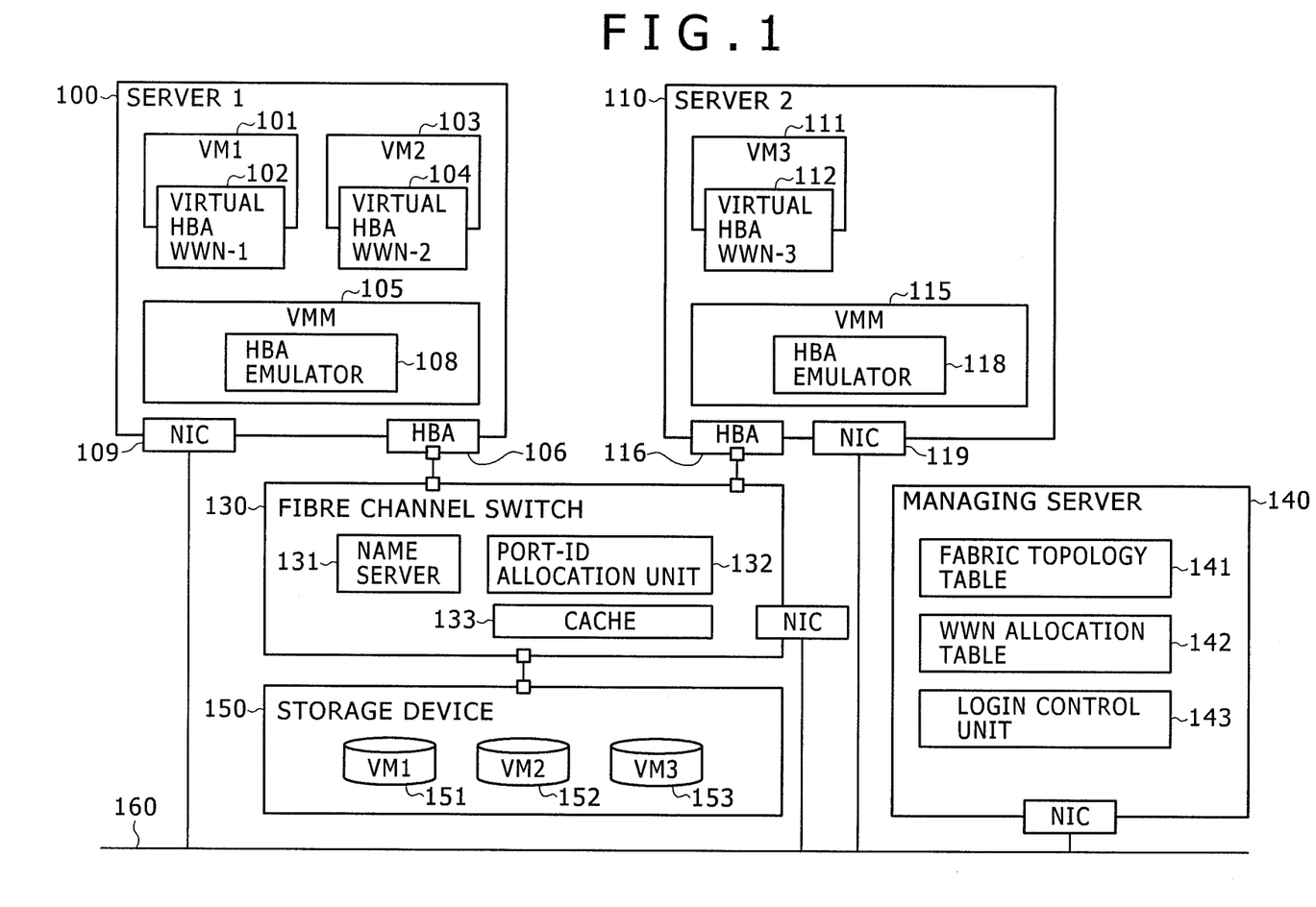
FIG. 1 is a drawing illustrating a system configuration in a first embodiment according to the present invention.

FIG. 1 illustrates a system configuration in the first embodiment. The system is configured with a server 1 (100), a server 2 (110), a storage device 150, a communication device (a Fibre Channel switch 130 in the present embodiment) which couples these devices, and a managing server 140.

The server 1 (100), the server 2 (110), the managing server 140, and the switch 130 are coupled to a network 160 in a communicative manner through network adapters (NIC) 109 and 119 mounted in each unit. The server 1 (100) and the server 2 (110) are coupled to the storage device 150 via the switch 130 with the use of Fibre Channel Host Bus Adapters (HBA) 106 and 116 mounted in each unit. The HBA 106 and the HBA 116 are given a WWN proper to each HBA.

It is assumed that the HBA 106 and the HBA 116 are a Fibre Channel adapter supporting NPIV. In the following explanation, it is also assumed that the switch 130 supports NPIV.

Figure 2:
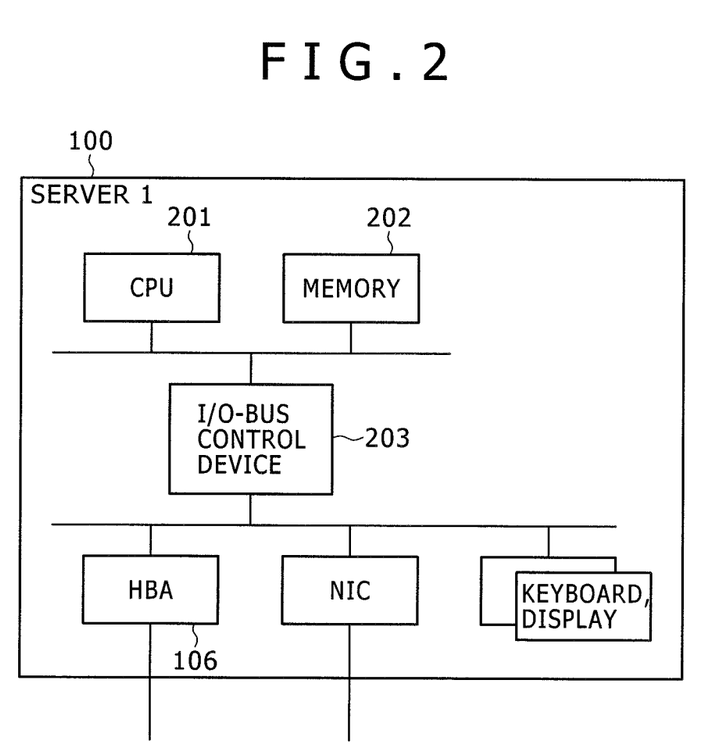
FIG. 2 is a drawing illustrating configuration of a computer in the first embodiment according to the present invention.

The server 1 (100), the server 2 (110), and the managing server are computers possessing a general configuration as illustrated in FIG. 2. FIG. 2 illustrates the configuration of the server 1 (100). The server 1 (100) includes a CPU 201, a memory 202, the HBA 106, and others. The CPU 201, the memory 202, and an I/O-bus control device 203 are coupled via a bus. The I/O-bus control device 203 couples the bus to which the CPU 201 is coupled with external devices (an I/O device 204 in the present embodiment), such as the HBA 106, a network adapter, a keyboard, and a display. The CPU 201 executes a virtual machine monitor (VMM), OS, an application program, etc. which are read into the memory 202. The following explanation assumes that the VMM, the OS, and the application program are executed. The server 2 (110) is also a computer possessing the same configuration.

Although not illustrated in a drawing, the managing server 140 is also a computer possessing the same configuration. However, the managing server 140 may not possess an HBA. The switch 130 also possesses a computer including a CPU, a memory, etc., and executes a program which carries out various kinds of control. In the following explanation, that a control program in the switch 130 runs means that the CPU in the switch 130 executes the program.

In the server 1 (100) and the server 2 (110) of FIG. 1, the virtual machine monitors VMM 105 and VMM 115 which realize virtualization are running. In the server 1 (100), two virtual computers VM1 (101) and VM2 (103) are running on the VMM 105. The VM1(101) and VM2 (103) possess a virtual HBA 102 and a virtual HBA 104, respectively, which are virtual HBAs formed by the VMM 105. Similarly, in the server 2 (110), a virtual computer VM3 (111) is running on the VMM 115, and the VM3 (111) is allocated a virtual HBA 112. Operation to the virtual HBAs is emulated by HBA emulators 108 and 118.

Volumes 151 thru 153 for each of the virtual computers are allocated to the storage device 150.

The VMM allocates a virtual WWN to each virtual HBA. Here, it is assumed that WWN-1 is allocated to the VM1, WWN-2 is allocated to the VM2, and WWN-3 is allocated to the VM3. For example, the VMM 105 directs the HBA 106 to enable WWN-1 and WWN-2. The HBA 106 allocates resources required to perform access to a fabric by means of WWN-1 and WWN-2. In the following explanation, it is assumed that the identifiers which identify the respective resources are VHBA-1 and VHBA-2. The same holds for the server 2 (110).

The OS executed by the virtual computer VM1 (101) issues directions to access the volume 151 in the storage device 150 through an I/O operation to the virtual HBA 102. The VMM 105 traps the I/O operation to the virtual HBA 102, and the HBA emulator 108 converts the operation into an I/O operation to the HBA 106 mounted in the server 1 (100) and directs the I/O operation to the HBA 106. At this time, the HBA emulator 108 directs the I/O operation to the HBA 106, by specifying a VM which has directed the I/O operation, and by attaching information which directs the use of a resource currently allocated to the VM. For example, when the access is from the VM1 (101), VHBA-1 is attached. The HBA 106 directs an actual fabric access using the attached resource identifier. In the present case, WWN-1 is associated as a WWN.

Here, a login procedure to a fabric of the Fibre Channel related to the present embodiment is explained.

An HBA of the Fibre Channel executes a procedure called login in coupling for the first time to a fabric which includes a switch and a storage device. In the present invention, a method of preventing duplicated access to a storage device is realized by improving the login procedure.

Figure 4:
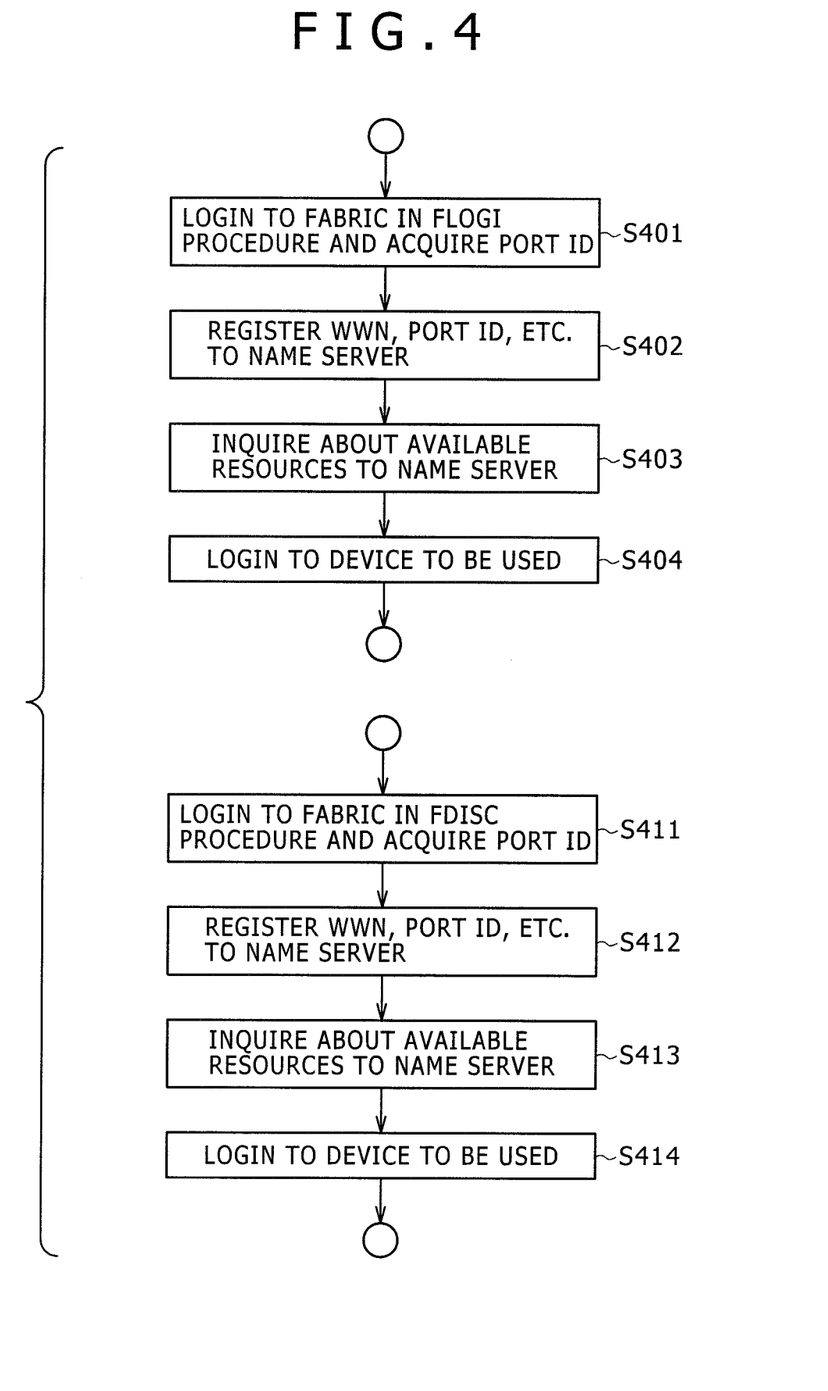
FIG. 4 is a flow chart illustrating a login procedure to a fabric in a Fibre Channel.

Here, a procedure at the time of the HBA 106 of a physical HBA logging in to a fabric is explained. The procedure is illustrated in FIG. 4.

When the HBA 106 accesses a fabric for the first time, the HBA 106 executes a fabric login (FLOGI) with a parameter WWN set to itself (Step S401). Upon receiving a fabric login request, the switch 130 allocates a port ID indicative of an address within the fabric of the port of the HBA 106 which has transmitted the login, and returns the port ID to the HBA 106. A port-ID allocation unit 132 executes the allocation of the port ID. Next, the HBA 106 registers own WWN and the supplied port ID to a name server 131 in the switch 130 (Step S402).

The name server 131 is service to be executed within the switch 130 which records classification, a WWN, a port ID allocated, etc. of a port of equipment coupled to the fabric. The HBA 106 inquires to the name server 131 about a device available from the HBA 106 (Step S403). The name server 131 returns an port ID of an accessible device to the HBA 106 with reference to the registered WWN of the HBA 106. The HBA 106 logins to the device using the port ID of the device, and secures a resource required for communication (Step S404). Subsequent communications with the HBA 106 and other equipment are performed with the use of the port ID of the HBA 106 and the port ID of the device, and the switch 130 performs communication routing based on the port ID.

In the HBA supporting NPIV, a procedure of login from a virtual HBA of a virtual computer is defined. For example, the following illustrates processing when the VM1 (102) is activated. The FLOGI described above is a procedure defined only to a physical HBA, and a different procedure is executed.

In login from a virtual HBA of a virtual computer, the second and later login to the fabric of the HBA 106 is realized by protocol called a fabric discovery (FDISC). The VMM 105 executes, to the HBA 106, the FDISC with WWN-1 as the WWN currently allocated to the VM1 (101). In the case, the FDISC is executed not using the port ID acquired by the FLOGI, but assuming that the port ID of the sending source is zero (Step S411).

When the FDISC without a port ID set is received, the switch 130 determines that the login is the second and later one from the virtual HBA, and attaches a new port ID to the supplied WWN (WWN-1, in the present case). The new port ID is recorded on a resource which is identified by the virtual HBA-1 (VHBA-1) in the HBA 106, and the latter operation specified as VHBA-1 is executed by attaching the port ID. Registration to the name server, an inquiry of an available device, and login to the device follow the same procedure as described above (Step S412 thru Step S414).

According to the above, a storage access from the virtual HBA 102 of the VM1 (101) is executed with the use of the port ID allocated to the WWN-1.

At this time, the switch 130 and the storage device 150 can perform access control on the basis of the WWN-1. In this way, access control is performed with reference to only the WWN of the equipment coupled to the fabric.

The present invention realizes a method of preventing unjust access to a volume in a storage device, by determining whether it is appropriate or not that a virtual WWN, presented when a virtual HBA logins to a fabric, is utilized by a server possessing the virtual HBA which has instructed the login. The following explains a system configuration, a data structure, and a procedure which are required to realize the method described above.

The managing server 140 illustrated in FIG. 1 includes a fabric topology table 141 which holds connection relation of the servers and the switch, a WWN allocation table 142 which holds WWN allocation to the servers, and a login control unit 143 which processes a login acceptance/rejection inquiry from the switch 130.

Figure 3:
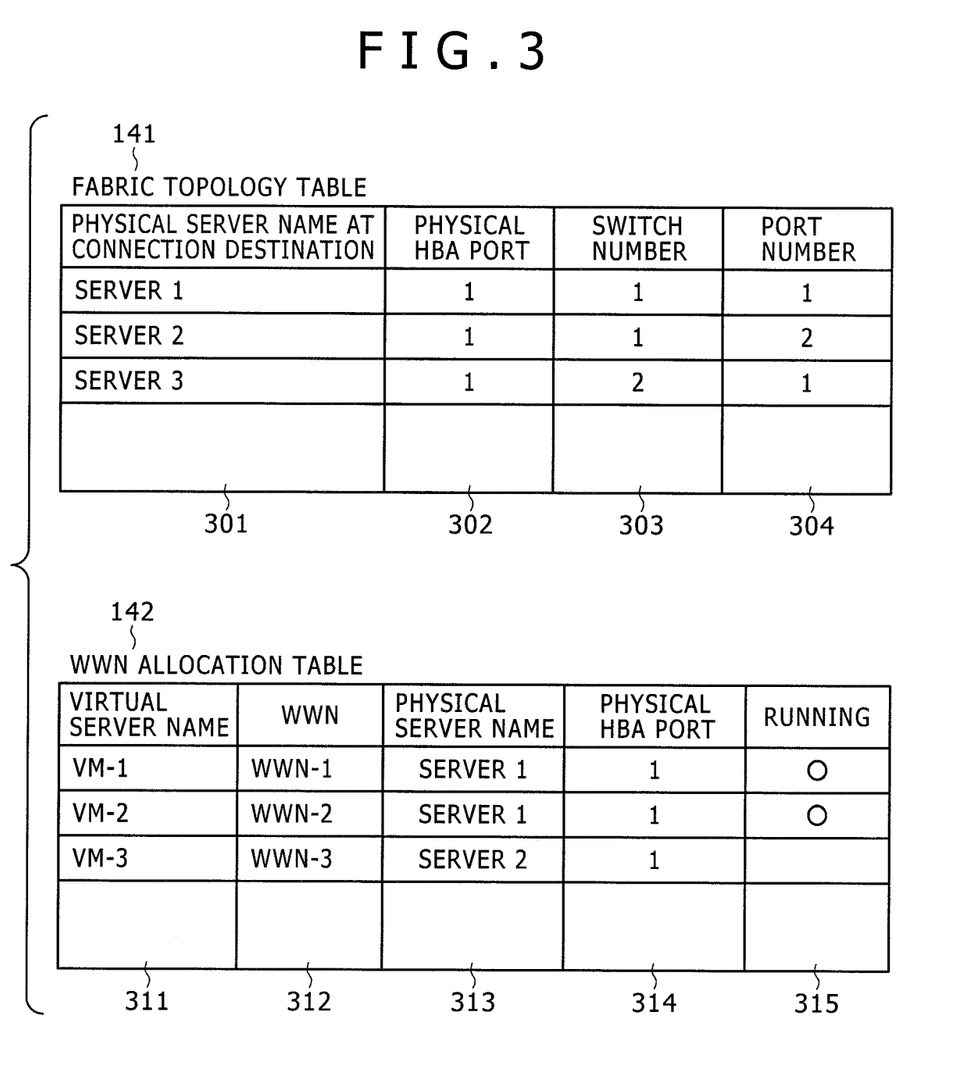
FIG. 3 is a drawing illustrating structure of data which a managing server holds in the first embodiment according to the present invention.

FIG. 3 illustrates a configuration of the fabric topology table 141 and the WWN allocation table 142. The fabric topology table 141 holds connection information of a server and a switch which form a Fibre Channel fabric. Specifically, what is recorded with respect to each connection between the physical server and the switch is a server name 301 which identifies the physical server coupled to the switch, a physical HBA port number 302 which indicates a port of the physical HBA coupled to the switch, and a switch number 303 and a port number 304 which identify to which port of which switch within the fabric the connection is established. It is assumed that the physical HBA port number 302 is a number which can identify uniquely all the ports of each physical HBA mounted in the server. The physical HBA port number 302 may be the combination of a number which identifies a physical HBA mounted in the server and a number which identifies all the ports in each physical HBA. It is assumed that the port number 304 of a switch is a number which can identify a port within the switch number 303. Like a domain ID defined in the Fibre Channel switch, the switch number 303 is assumed to be a number which can identify a switch within a fabric and which the switch itself can acquire.

For example, the topology table 141 illustrates that Port 1 which exists in the physical HBA 106 included in the server 1 (100) is coupled with Port 1 of the switch 130 which is identified as No. 1 in the fabric.

Although the topology table 141 is created as configuration management information of a system, the present invention does not care about how to acquire data required for the creation.

Figure 10:
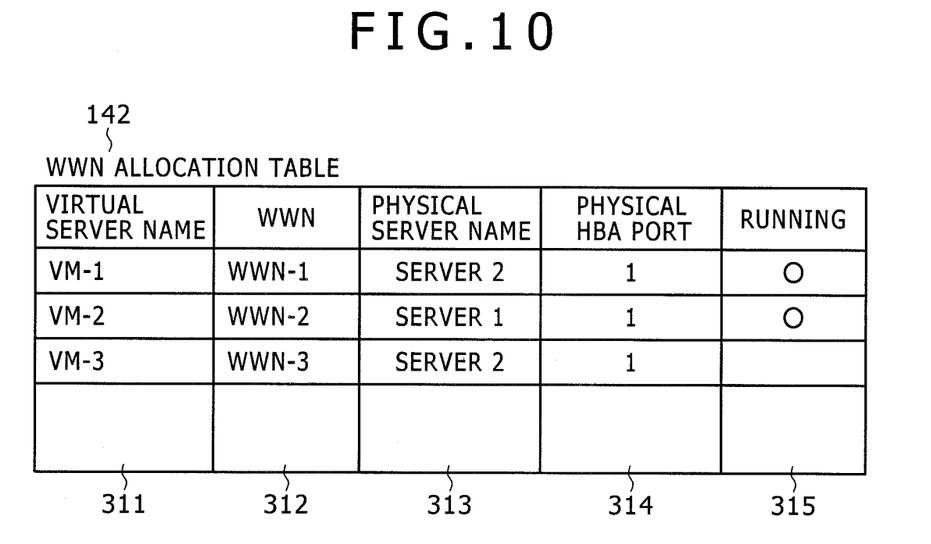
FIG. 10 is a drawing illustrating structure of data after updating, which is held by the managing server, in the first embodiment according to the present invention.

A WWN allocation table 142 records the allocation of a virtual WWN to a virtual computer included in the system, and the configuration indicating each of virtual computers running in each of physical servers. Specifically, what is recorded is the name of a virtual computer 311 and a virtual WWN 312 allocated to the virtual computer, the name of a physical server 313 which the virtual computer executes, and the port number 314 of a physical HBA to be allocated to a virtual HBA when executing with the server. A number given under the same rule as the physical HBA port number 302 of the topology table 141 is recorded as the port number 314. The name of the virtual computer 311, the virtual WWN 312, and the physical HBA port number 314 can be acquired from the configuration information of VMM. The name of the physical server 313 which executes the virtual computer is the information specified by the server manager. A system manager updates data of the WWN allocation table 142 as well, when migrating a virtual computer between physical servers. FIG. 10 illustrates a state after updating of the WWN allocation table 142. FIG. 10 illustrates a state when the virtual computer VM1 (101) has been migrated to the server 2 (110). The physical server name in the table 142 is rewritten as "server 2." The value of the physical HBA port is not changed. This indicates the fact that the virtual computer VM1(101) uses the physical HBA port 1 mounted in the server 2 (110) of the migration destination. The present updating may be automated by control mechanism of the virtualization mechanism. The present issue will be explained in the second embodiment. The WWN allocation table 142 may also hold a run state 315 which indicates whether a virtual computer which uses each WWN is running. Upon receiving a request for determination of fabric login acceptance/rejection from the port-ID allocation unit 132 included in the switch 130, the login control unit 143 determines the login acceptance/rejection concerned based on the contents of the topology table 141 and the WWN allocation table 142.

Figure 5:
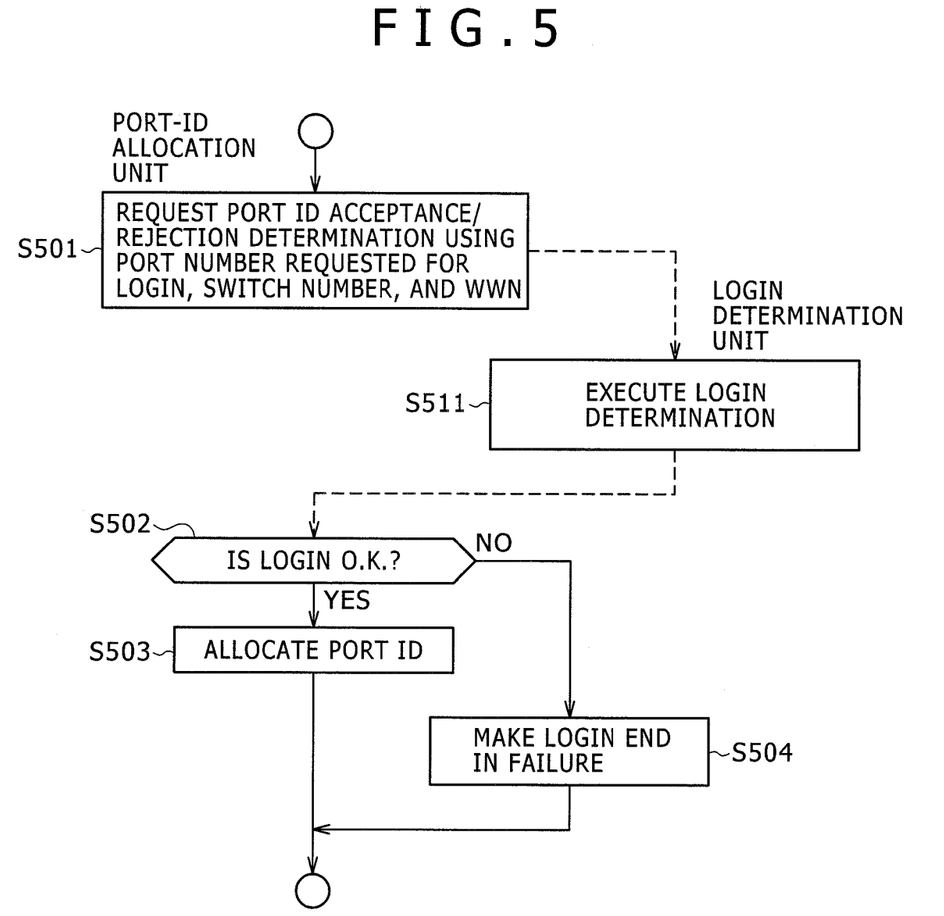
FIG. 5 is a flow chart illustrating an allocation procedure of a port ID in a switch in the first embodiment according to the present invention.

FIG. 5 illustrates an allocating procedure of a port ID by the processing of the port allocation unit 132 and the login control unit 143. Here, the explanation is made as the processing at the time of the virtual HBA 102 logging in to the fabric.

The VMM 105 executes login to the fabric of the virtual HBA 102 as the processing at the activation time of the VM1 (101). Specifically, a resource for the virtual HBA 102 is allocated to the physical HBA 106, and WWN-1 as the virtual WWN is registered. Then, the FDISC (Fabric Discovery) procedure is directed to be executed employing the resource. The FDISC is a procedure defined by the Fibre Channel protocol, and is a procedure for discovering service on a fabric which can be utilized from the HBA. In the NPIV, the procedure defines an additional WWN to a port of the HBA, after extending the original FDISC. In response to the directions, the physical HBA 106 executes the FDISC using WWN-1 as the WWN, WWN-1 being the WWN of the virtual HBA 102. At this time, it is assumed that the port ID of the sending source is zero.

The switch 130 starts allocation of a port ID by the port-ID allocation unit 132, in response to the FDISC from the physical HBA 106. First, the port-ID allocation unit 132 calls the login control unit 143 of the managing server 120, with parameters of a port number where the FDISC has been executed, a switch number set to the switch 130, and a WWN supplied by the FDISC (Step S501).

The login control unit 143 of the managing server 140 determines acceptance/rejection of login to the fabric using the supplied WWN in the port indicated by the switch number and the port number which are supplied (Step S511).

When the result of the login control unit 143 is that the login is accepted (Step S502), the port-ID allocation unit 132 allocates the port ID to the login operation (Step S503). When the login is rejected, the login is made to end in failure (Step S504). "Make the login end in failure" means that the physical HBA 106 is answered by REJECT etc. The above-mentioned login answer is repeated until a REJECT answer is repeated five times, but when the REJECT answer is repeated five times or more, the login processing stops.

Figure 6:
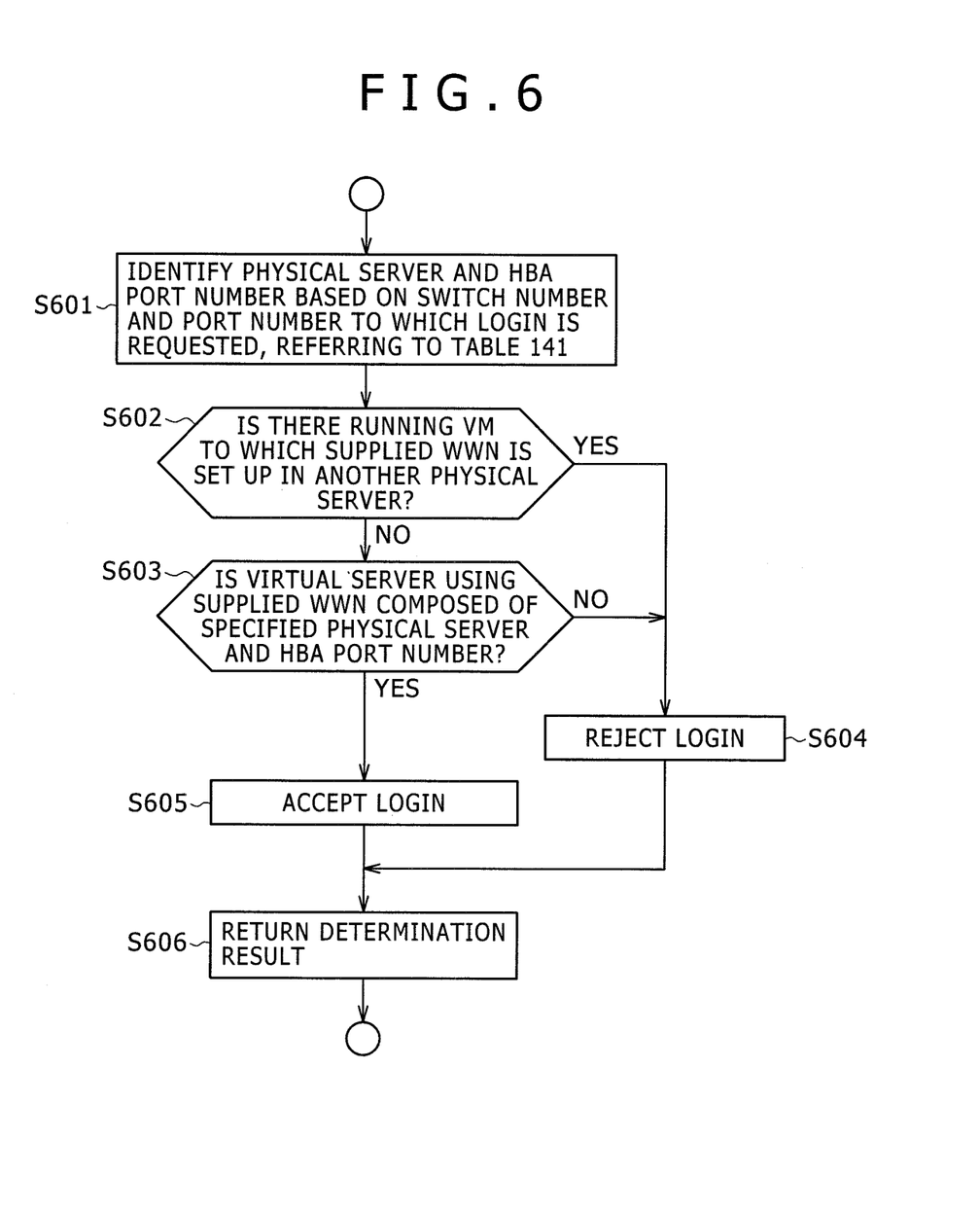
FIG. 6 is a flow chart illustrating a login acceptance/rejection determining procedure in a managing server in the first embodiment according to the present invention.

Next, processing of the login control unit 143 of the managing server 140 is explained. FIG. 6 illustrates a process flow of the login control unit 143.

The login control unit 143 performs execution when called from the port-ID allocation unit 132 of the switch 130. First, according to the switch number and the port number which have been supplied, the login control unit 143 acquires a physical server and the number of a physical HBA port which are coupled to the port of the switch concerned, with reference to the fabric topology table 141 (Step S601).

Next, with reference to the WWN allocation table 142, the login control unit 143 searches for a virtual computer which is allocated the same WWN as the supplied WWN and which is already running on another physical server (Step S602). Since an unjust duplicated access to the same storage volume may happen when such a virtual computer exists, the login is determined to be unacceptable (Step S604), and the result is answered (Step S606).

When such a virtual computer does not exist, the login control unit 143 refers to the WWN allocation table 142, and searches whether a virtual computer of which the supplied WWN is defined is configured with the combination of the physical server and the physical HBA port which have been acquired (Step S603). Since an unjust access may happen with a high possibility when such a virtual computer is not defined, the login is determined to be unacceptable (Step S604), and the result is answered (Step S606).

When such a virtual computer is configured, it is determined that a virtual computer as the manager assumes is to be executed, and the login is determined to be acceptable (Step S605). The finally obtained result is answered to the port-ID allocation unit 132 (Step S606).

In order to call the login control unit 143 of the managing server 140 from the switch 130, information on a network address of the managing server 140 and on a protocol for passing a parameter is required. These kinds of information can be set to the switch 130 by a manager. For example, it is assumed that the managing server 130 releases an interface of the login control unit 143 into Web service which uses SOAP. In this case, if the manager sets URL of WSDL (Web Services Description Language) of the Web service to the switch 130, it becomes possible to call the login control unit 143 of the managing server 140 from the switch 130. Here, it is assumed that the switch 130 provides an interface which can set up the URL.

If the connection with the external device 150 as described above is cut off, it is necessary to redo the processing.

According to the above description, when a virtual computer is activated, it is possible to determine whether access to a fabric by means of the WWN currently allocated to the virtual computer is just. Accordingly, when the access is unjust with a high possibility, the subsequent access can be prevented. Specifically, it is possible to prevent a case where a virtual computer which is allocated the same WWN is running on another computer and a case where a virtual computer which is configured without involving the managing server 140 is allocated an unjust WWN and begins running.

By providing the managing server 140 with a determination unit which has been explained as the login control unit 143 in the present embodiment, it is possible to add environmental information of the circumference of the virtual computer to determining of login. Thereby, an exact access control to a fabric of a virtual computer is possible, using the combination of a virtual WWN, a port number, and a physical server name.

Although the present embodiment shows an example in which the determination unit is provided within the managing server 140, the determination unit may be another communication device, as long as it can grasp a connected state of a physical computer and an external device. Although the present embodiment shows an example of a Fibre Channel switch, the Fibre Channel switch may be another communication device, as long as it is coupled with an external device which is accessed by a physical computer.

The present embodiment does not explain control in migration within the same physical computer. This is because, if migration is performed within the same physical computer, the same VMM manages the control thereof; therefore, it is unthinkable to set up the same address, and it is thought that the present problem does not take place.

(Embodiment 2)

Next, a second embodiment to which the present invention is applied is explained. In the first embodiment, it is explained that allocating of the port ID is performed at the time when a virtual computer is activated. However, the application of the present invention is not limited to the case. For example, in the case where a virtual computer is migrated, at the time of resuming execution of the virtual computer in the migration destination, VMM may execute login to a fabric and the processing shown by the present invention may be executed in allocating the port ID at that time.

In this case, it is necessary to update appropriately the WWN allocation table 142 of the managing server 140. Specifically, it is necessary to update the physical server name 313 and the physical HBA port number 314 of the WWN allocation table 142 to the information of the migration destination. It is sufficient that the updating is performed in cooperation with a program which controls migration of the virtual computer.

Figure 7:
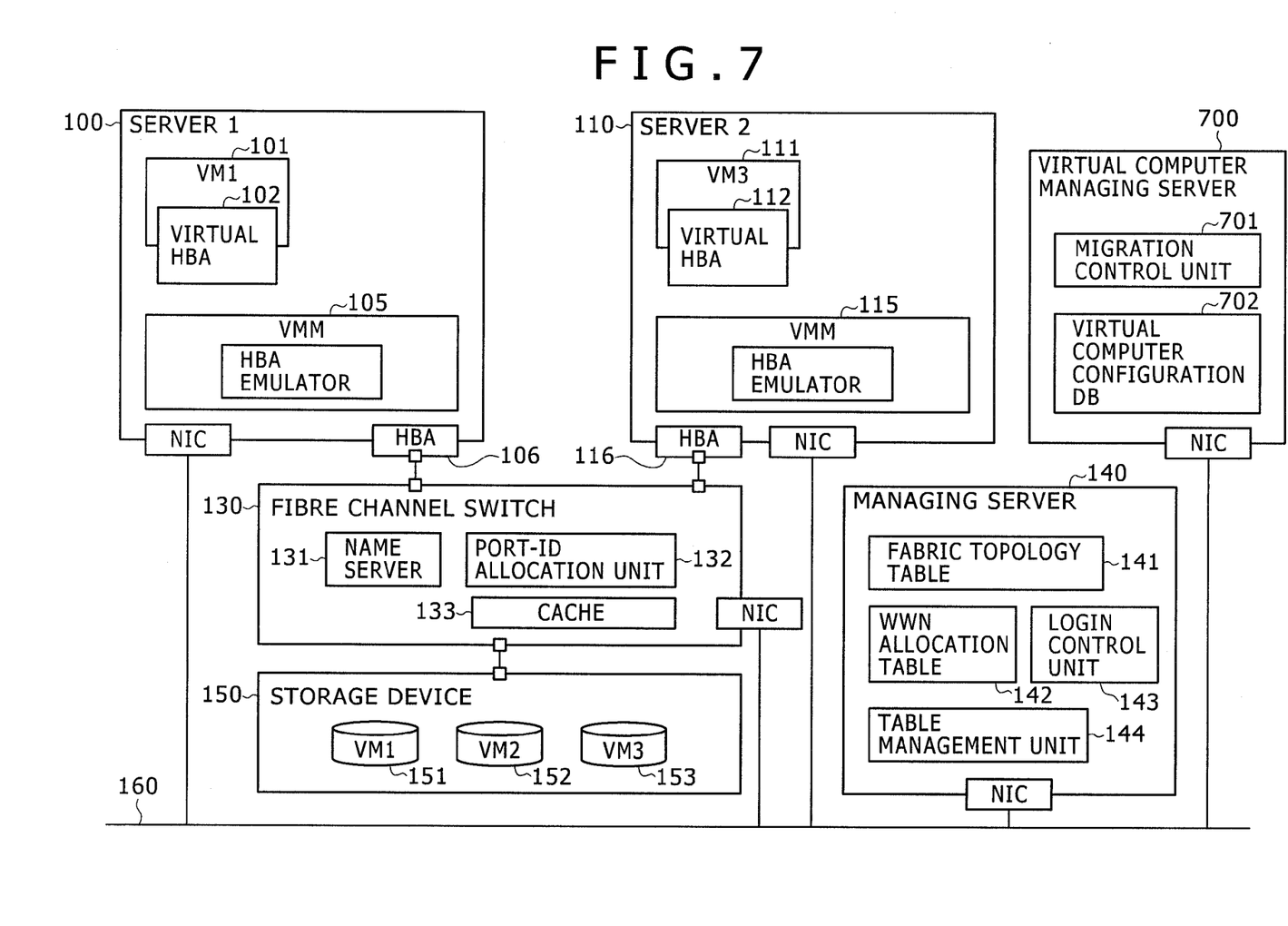
FIG. 7 is a drawing illustrating a system configuration in a second and a third embodiment according to the present invention.

FIG. 7 illustrates an example of a system configuration which realizes the second embodiment of the present invention. In addition to the system components in the first embodiment, a virtual computer managing server 700 is coupled to the network 160. A virtual computer managing server 700 includes a virtual computer configuration DB (database) 702 which holds definition information of a virtual computer in the system, and a migration control unit 701 which controls migration of the virtual computer between physical servers.

The managing server 140 further includes a table management unit 144 which manages the fabric topology table 141 and the WWN allocation table 142. It is assumed that the table management unit 144 provides an interface which can be called from the exterior.

The migration control unit 701 updates the WWN allocation table 142 of the managing server 140 when migrating the definition of the virtual computer. When the VM1 (101) migrates to the server 2 (110), for example, the migration control unit 701 notifies the table management unit 144 of the managing server 140 that, as for the configuration of the VM1 (101), the execution server is changed to the server 2 (110) and the virtual HBA 102 currently allocated to it utilizes the port 1 of the physical HBA 116 in the migration destination. The table management unit 144 updates the WWN allocation table 142 in response to the notice.

The aforementioned updating may be executed when migrating a virtual computer under operation. When migrating the VM1 (101) under operation, a memory content of the VM1 (101) to be migrated will be copied from the server 1 (100) to the server 2 (110). In order to copy the memory content at a certain moment, it is necessary to once interrupt execution of the VM1 (101). During the interruption, the migration control unit 701 executes the aforementioned updating. Then, the VMM 115 of the migration destination resumes the execution of the VM1 (101). In this case, the VMM 115 executes the port-ID allocating illustrated in FIG. 5 in the first embodiment. Since the contents of the WWN allocation table 142 are updated by the right information when executing the allocating, the login is determined to be just and a new port ID is allocated by the allocating. By the present processing, the VM1 (101) can continue accessing to a volume of an accessible storage device by using the same WWN after the resumption as well as before the interruption.

As described above, by cooperating with the control procedure of migration of a virtual computer, the justification of login to the fabric of the virtual HBA can be confirmed correctly, even when the virtual computer migrates between servers.

According to the first embodiment, the VMM is assumed to perform login to the fabric of the virtual HBA at the time of activating the virtual computer. However, as in the second embodiment, the VMM may perform login to the fabric of the virtual HBA, at the time when the virtual computer is resumed from the interrupted state. According to the aforementioned procedure, the justification of storage access can be confirmed, even when the virtual computer under operation is migrated.

(Embodiment 3)

Next, a third embodiment to which the present invention is applied is explained. In the embodiments described above, the switch 130 inquires about login acceptance/rejection to the managing server 140 via the network 160, and it is determined whether the login to the fabric at each time is just. However, when the managing server 140 has stopped due to a failure, or when a failure has happened in the network 160, an inquiry to the managing server 140 from the switch 130 cannot be executed. In this case, it becomes difficult to execute acceptance/rejection determination of login to a fabric, and the execution of the virtual computer will be disturbed.

According to the third embodiment, the switch 130 acquires periodically the summary information of the fabric topology table 141 and the WWN allocation table 142 from the managing server 140, and records the information as a cache 133. The port-ID allocation unit 132 determines the acceptance/rejection of login to the fabric based on the contents of the cache 133, when coupling to the managing server 140 is difficult.

Figure 8:
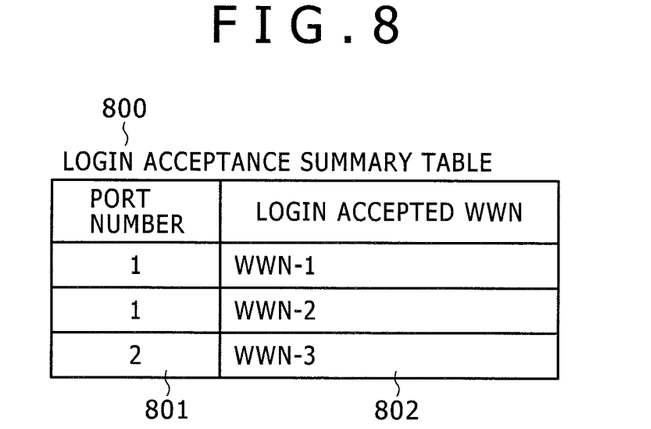
FIG. 8 is a drawing illustrating structure of data which a managing server holds in the third embodiment according to the present invention.

The system configuration according to the third embodiment is illustrated in FIG. 7, which is the same as in the second embodiment. Here, the table management unit 144 provides an interface which generates summary information of the fabric topology table 141 and the WWN allocation table 142, which are related to a specified switch number. A data structure of the summary information is illustrated in FIG. 8.

A login acceptance summary table 800 as the summary information includes a port number 801 of the switch and a WWN 802 with which the login in the port is accepted.

A generation procedure of the summary information is explained. The switch 130 inquires about the login acceptance summary information periodically to the table management unit 144 of the managing server 140, for determination of the acceptance/rejection of login which is issued to the switch 130 itself. At this time, the switch 130 makes the inquiry with the use of the switch number set to the switch itself. The managing server 140 makes a list of servers and physical HBA ports which are coupled to each port of the switch corresponding to the supplied switch number, with reference to the fabric topology table 141. Next, referring to the WWN allocation table 142 with respect to each combination of the listed servers and the physical HBA ports, the managing server 140 searches for a virtual WWN allocated to a virtual computer which runs using the combination. Accordingly, a group of WWNs of a virtual HBA which can login to each port of the switch is obtained. This results in the login acceptance summary table 800. The switch 130 saves the contents acquired by the inquiry as the cache 133, and enables the contents to be referred to by the port-ID allocation unit 132.

Figure 9:
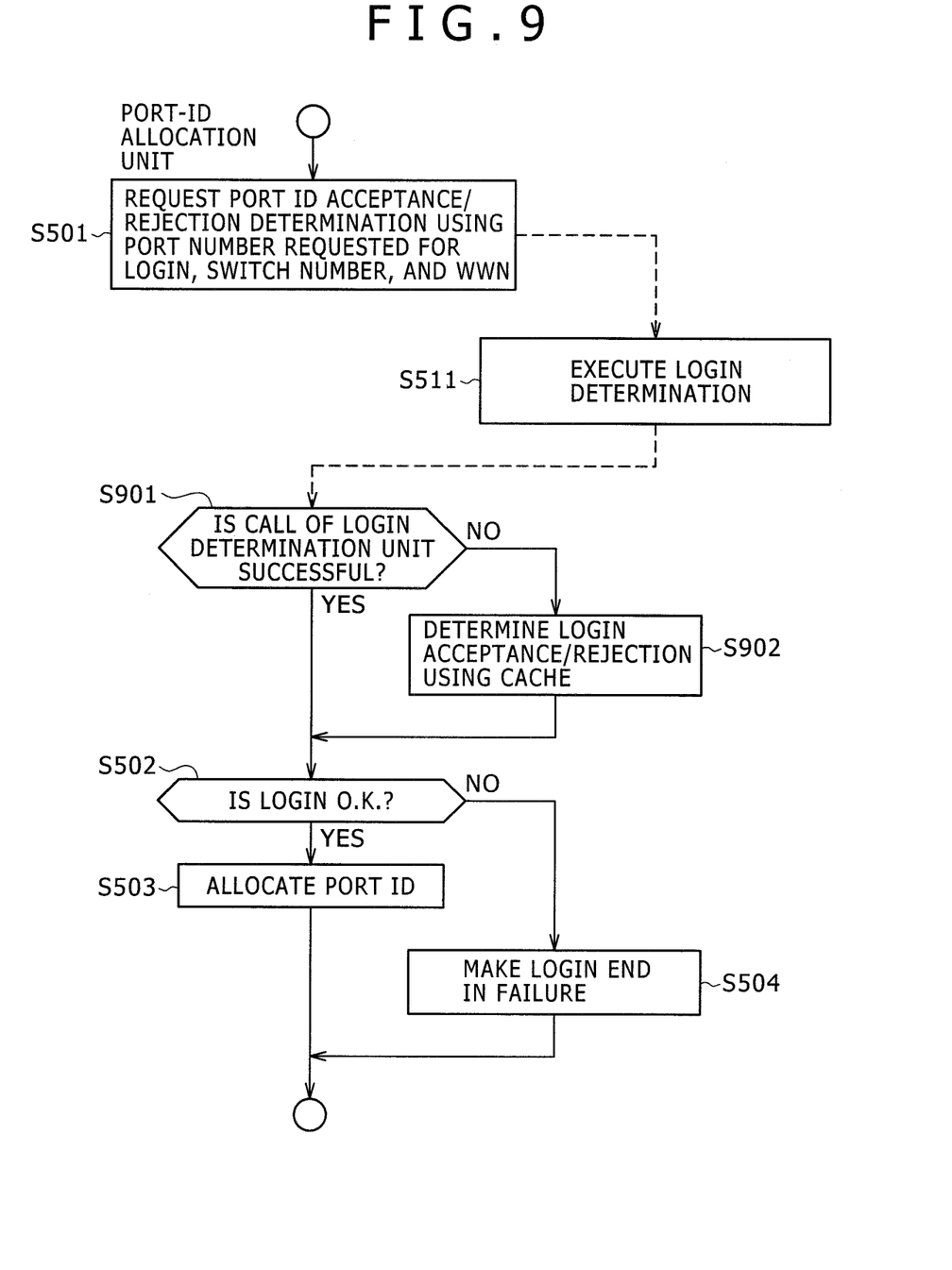
FIG. 9 is a flow chart illustrating an allocation procedure of a port ID in a switch in the third embodiment according to the present invention.

Since the port-ID allocation unit 132 refers to the cache 133, the processing differs from that in the first embodiment a little. FIG. 9 illustrates a process flow of the port-ID allocation unit 132 in the third embodiment. What is different from the flow illustrated in FIG. 5 is explained.

The port-ID allocation unit 132 calls the login control unit 143 of the managing server 140 at Step S501 and determines whether the call itself is successful (Step S901). In Step S901, what is determined is not a return value of the call, but what is determined is whether the call has been successful and a return value has been acquired. When the return value cannot be acquired, the login acceptance/rejection is determined according to the contents of the cache 133 (Step S902).

The contents of the cache 133 are the login acceptance summary table 800. By referring to the table 800, the port-ID allocation unit 132 can determine whether the supplied WWN is accepted for logging in to the port where the login has been executed. The login determination at Step S502 is executed by the above procedure.

By the above, even if the switch 130 cannot communicate with the login control unit 143 of the managing server 140 due to a failure, it is possible to determine the acceptance/rejection of login to the fabric by means of the virtual HBA, according to the configuration information which has been considered to be correct at a certain time in the past.

Three embodiments are explained in the above. A network to which the present invention can be applied is not limited to the Fibre Channel network as explained in the embodiments. It is the requirements for operation of the present invention that a network includes a switch which couples a computer and an adapter mounted on the computer, and a managing server which holds configuration information of the computer coupled to the switch, and that the switch possesses a function to inquire to the managing server about acceptance/rejection of communication from a certain computer. It is sufficient that the managing server provides processing for determining the acceptance/rejection of communication not only from information about a port to which the communication is executed but from the configuration information of the computers of the entire system.

It should be understood by those skilled in the art that various modifications and combinations, sub-combinations and alterations may occur depending on design requirements and other factors insofar as they are within the scope of the appended claims or the equivalents thereof.

What is claimed is:

1. A computer system comprising:
a plurality of physical computers;
an external device which is coupled with the physical computers via a communication device having a plurality of ports;
at least one virtual computer operable to be executed on the physical computers; and
a determination unit operable to determine whether login to the external device from the virtual computer is acceptable or unacceptable,
wherein the virtual computer is allocated an identifier for accessing the external device,
wherein, upon receiving a login request to the external device from a certain virtual computer,
the determination unit determines the physical computer which is coupled with a port of the communication device receiving the login request based on information of the port of the communication device receiving the login request with reference to a connection information of the physical computer and the communication device,
the determination unit compares the identifier allocated to the virtual computer requesting login with the identifier allocated to another virtual computer to be executed on the physical computer different from the physical computer on which the virtual computer requesting login is executed, with reference to allocation information of the physical computer executing the virtual computer and the identifier allocated to the virtual computer, and
when the identifier allocated to the virtual computer requesting login agrees with the identifier allocated to the another virtual computer, the login is rejected,
when the identifier allocated to the virtual computer requesting login does not agree with the identifier allocated to the another virtual computer, the determination unit searches whether a virtual computer which is defined with the identifier allocated to the virtual computer requesting login is configured, with reference to the allocation information, and
the login is accepted when the virtual computer which is defined with the identifier allocated to the virtual computer requesting login, is configured,
the login is not accepted when the virtual computer which is defined with the identifier allocated to the virtual computer requesting login, is not configured.

2. The computer system according to claim 1,
wherein a port number is allocated to the port of the communication device,
wherein the information of the port is the port number of the communication device receiving the login request.

3. The computer system according to claim 2,
wherein the external device is an I/O device, and the identifier is a World Wide Name (WWN).

4. The computer system according to claim 3,
wherein the communication device is a Fibre Channel switch,
wherein the physical computer includes a physical Host Bus Adapter (HBA) coupled to the Fibre Channel switch,
wherein the virtual computer includes a virtual HBA to be executed under the control of a virtual machine monitor in the physical computer and utilizing the allocated WWN,
wherein the virtual machine monitor instructs I/O operation to the physical HBA by emulating I/O operation to the virtual HBA for the virtual computer to access the I/O device, and
wherein the determination unit possesses a function to answer refusal of connection to the physical HBA, when the determination unit refuses the login.

5. The computer system according to claim 3, further comprising:
a managing unit coupled to the physical computer and the communication device, and operable to manage control of the virtual computer,
wherein the managing unit possesses the connection information, the allocation information, and the determination unit.

6. The computer system according to claim 5,
wherein the managing unit includes the determination unit, and
wherein the login inquiry is transmitted from the communication device.

7. The computer system according to claim 3,
wherein the communication device includes a cache holding allocation information of the WWN.

8. The computer system according to claim 7,
wherein the physical HBA is coupled to the communication device via a physical HBA port,
wherein the virtual machine monitor on which the virtual computer runs in the physical computer executes login to the physical HBA with WWN allocated to the virtual computer,
wherein the virtual HBA is allocated a port ID by a port ID allocation unit in the communication device when the login to the external device from the virtual computer is accepted, and
an access from the virtual HBA to the external device after the login, is executed with the use of the port ID.

9. The computer system according to claim 7,
wherein the physical HBA is coupled to the communication device via a port,
wherein the port possesses a port ID allocated by a port-ID allocation unit included in the communication device,
wherein the port ID is held in connection information of the physical computer and the communication device, and wherein the managing unit possesses the connection information.

10. The computer system according to claim 3,
wherein the determination is performed after one of: updating allocation information of the WWN when the virtual computer is activated after the virtual computer is moved onto another physical computer; and updating the allocation information when the virtual computer is suspended to move onto a different physical computer.

11. An access control method effected by a virtual computer system including:
a plurality of physical computers;
an external device which is coupled with the physical computers via a communication device having a plurality of ports;
at least one virtual computer operable to be executed on the physical computers; and
a determination unit operable to determine whether login to the external device from the virtual computer is acceptable or unacceptable,
the access control method comprising:
allocating to the virtual computer, an identifier for accessing the external device,
upon receiving a login request to the external device from a certain virtual computer:
determining, via the determination unit, the physical computer which is coupled with a port of the communication device receiving the login request based on information of the port of the communication device receiving the login request with reference to a connection information of the physical computer and the communication device,
comparing, via the determination unit, the identifier allocated to the virtual computer requesting login with the identifier allocated to another virtual computer to be executed on the physical computer different from the physical computer on which the virtual computer requesting login is executed, with reference to allocation information of the physical computer executing the virtual computer and the identifier allocated to the virtual computer, and
when the identifier allocated to the virtual computer requesting login agrees with the identifier allocated to the another virtual computer, the login is rejected,
when the identifier allocated to the virtual computer requesting login does not agree with the identifier allocated to the another virtual computer, then searching, via the determination unit, whether a virtual computer which is defined with the identifier allocated to the virtual computer requesting login is configured, with reference to the allocation information, and
the login is accepted when the virtual computer which is defined with the identifier allocated to the virtual computer requesting login, is configured,
the login is not accepted when the virtual computer which is defined with the identifier allocated to the virtual computer requesting login, is not configured.

12. The access control method according to claim 11,
wherein a port number is allocated to the port of the communication device,
wherein the information of the port is the port number of the communication device receiving the login request.

13. The access control method according to claim 12,
wherein the external device is an I/O device, and the identifier is a World Wide Name (WWN).

14. The access control method according to claim 13,
wherein the communication device is a Fibre Channel switch,
wherein the physical computer includes a physical Host Bus Adapter (HBA) coupled to the Fibre Channel switch,
wherein the virtual computer includes a virtual HBA to be executed under the control of a virtual machine monitor in the physical computer and utilizing the allocated WWN,
the method further comprising:
instructing, via the virtual machine monitor, I/O operation to the physical HBA by emulating I/O operation to the virtual HBA for the virtual computer to access the I/O device, and
the determination unit answering refusal of connection to the physical HBA, when the determination unit refuses the login.

15. The access control method according to claim 13,
wherein the virtual computer system further including:
a managing unit coupled to the physical computer and the communication device, and operable to manage control of the virtual computer, and
wherein the managing unit possesses the connection information, the allocation information, and the determination unit.

16. The access control method according to claim 15,
wherein the managing unit includes the determination unit, and
wherein the login inquiry is transmitted from the communication device.

17. The access control method according to claim 13,
wherein the communication device includes a cache holding allocation information of the WWN.

18. The access control method according to claim 17,
wherein the physical HBA is coupled to the communication device via a physical HBA port,
wherein the virtual machine monitor on which the virtual computer runs in the physical computer executes login to the physical HBA with WWN allocated to the virtual computer,
wherein the virtual HBA is allocated a port ID by a port ID allocation unit in the communication device when the login to the external device from the virtual computer is accepted, and
an access from the virtual HBA to the external device after the login, is executed with the use of the port ID.

19. A non-transitory, computer-readable medium embodying a program for effecting an access control method effected by a virtual computer system including:
a plurality of physical computers;
an external device which is coupled with the physical computers via a communication device having a plurality of ports;
at least one virtual computer operable to be executed on the physical computers; and
a determination unit operable to determine whether login to the external device from the virtual computer is acceptable or unacceptable,
the program, when effected in the virtual computer system, providing operations comprising:
allocating to the virtual computer, an identifier for accessing the external device,
upon receiving a login request to the external device from a certain virtual computer:
determining, via the determination unit, the physical computer which is coupled with a port of the communication device receiving the login request based on information of the port of the communication device receiving the login request with reference to a connection information of the physical computer and the communication device, comparing, via the determination unit, the identifier allocated to the virtual computer requesting login with the identifier allocated to another virtual computer to be executed on the physical computer different from the physical computer on which the virtual computer requesting login is executed, with reference to allocation information of the physical computer executing the virtual computer and the identifier allocated to the virtual computer, and when the identifier allocated to the virtual computer requesting login agrees with the identifier allocated to the another virtual computer, the login is rejected, when the identifier allocated to the virtual computer requesting login does not agree with the identifier allocated to the another virtual computer, then searching, via the determination unit, whether a virtual computer which is defined with the identifier allocated to the virtual computer requesting login is configured, with reference to the allocation information, and the login is accepted when the virtual computer which is defined with the identifier allocated to the virtual computer requesting login, is configured, the login is not accepted when the virtual computer which is defined with the identifier allocated to the virtual computer requesting login, is not configured.

20. The non-transitory, computer-readable medium according to claim 19, wherein the communication device is a Fibre Channel switch.

* * * * *